United States Patent
Jeong et al.

(10) Patent No.: US 12,481,765 B2
(45) Date of Patent: Nov. 25, 2025

(54) METHOD FOR EXTRACTING ARTIFICIAL NEURAL NETWORK BY USING MELTDOWN VULNERABILITY

(71) Applicant: KOREA UNIVERSITY RESEARCH AND BUSINESS FOUNDATION, Seoul (KR)

(72) Inventors: Hoyong Jeong, Goyang-si (KR); Do-Hyun Ryu, Seoul (KR); Junbeom Hur, Yongin-si (KR)

(73) Assignee: Korea University Research and Business Foundation, Seoul (KR)

( * ) Notice: Subject to any disclaimer, the term of this patent is extended or adjusted under 35 U.S.C. 154(b) by 348 days.

(21) Appl. No.: 18/028,851

(22) PCT Filed: Sep. 28, 2021

(86) PCT No.: PCT/KR2021/013267
§ 371 (c)(1),
(2) Date: Nov. 6, 2023

(87) PCT Pub. No.: WO2022/065992
PCT Pub. Date: Mar. 31, 2022

(65) Prior Publication Data
US 2024/0220627 A1  Jul. 4, 2024

(30) Foreign Application Priority Data

Sep. 28, 2020 (KR) .................. 10-2020-0126036
Aug. 23, 2021 (KR) .................. 10-2021-0111132

(51) Int. Cl.
*G06F 21/57* (2013.01)
(52) U.S. Cl.
CPC ...... *G06F 21/577* (2013.01); *G06F 2221/033* (2013.01)

(58) Field of Classification Search
CPC ..................................................... G06F 21/577
(Continued)

(56) References Cited

U.S. PATENT DOCUMENTS 7,962,901 B2 * 6/2011 McCamant ......... G06F 11/3612
703/22
7,971,255 B1 * 6/2011 Kc ........................ G06F 21/566
713/188
(Continued)

FOREIGN PATENT DOCUMENTS

CN  110851836 A  2/2020

OTHER PUBLICATIONS

Jeong, Hoyong, Dohyun Ryu, and Junbeom Hur. "Extracting Neural Networks via Meltdown." *Journal of the Korea Institute of Information Security & Cryptology* 30.6 (Dec. 31, 2020): 1031-1041.
(Continued)

*Primary Examiner* — Dant B Shaifer Harriman
(74) *Attorney, Agent, or Firm* — NSIP Law

(57) ABSTRACT

An artificial neural network extraction method is disclosed. The artificial neural network extraction method is performed by a computing device which can communicate with a server for providing Machine-Learning-as-a-Service (MLaaS) and which includes at least a processor, the method comprising the steps of: acquiring a page table of a process to be attacked; acquiring, on the basis of the page table, heap area data of the process to be attacked; acquiring, on the basis of the heap area data, an artificial neural network instance of the process to be attacked; and extracting a structure of an artificial neural network model on the basis of the artificial neural network instance.

6 Claims, 11 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 9,760,464 | B1* | 9/2017 | Helliwell | G06F 11/3037 |
| 9,824,005 | B1* | 11/2017 | Helliwell | G06F 12/023 |
| 10,210,329 | B1* | 2/2019 | Malik | H04L 63/1466 |
| 10,430,586 | B1* | 10/2019 | Paithane | G06F 21/566 |
| 10,628,586 | B1* | 4/2020 | Jung | G06F 11/3037 |
| 11,036,480 | B2* | 6/2021 | Du | G06F 8/35 |
| 11,334,329 | B2* | 5/2022 | Du | G06F 8/447 |
| 11,588,845 | B2* | 2/2023 | Lothspeich | H04W 12/121 |
| 11,683,291 | B2* | 6/2023 | Velugu | H04L 63/1433 726/11 |
| 11,765,188 | B2* | 9/2023 | Syrivelis | G06N 5/04 726/23 |
| 12,169,563 | B2* | 12/2024 | Gechman | G06F 21/566 |
| 2008/0120604 | A1* | 5/2008 | Morris | G06F 11/3644 717/128 |
| 2010/0106920 | A1* | 4/2010 | Anckaert | G06F 12/1408 711/E12.001 |
| 2011/0030060 | A1* | 2/2011 | Kejriwal | H04L 63/1416 726/25 |
| 2011/0219035 | A1* | 9/2011 | Korsunsky | H04L 63/102 707/E17.005 |
| 2015/0379430 | A1 | 12/2015 | Dirac et al. | |
| 2020/0034538 | A1* | 1/2020 | Woodward | G06F 21/566 |
| 2021/0326748 | A1* | 10/2021 | van Vredendaal | G06N 20/00 |
| 2021/0351911 | A1* | 11/2021 | Kodalapura | H04L 9/005 |
| 2022/0123930 | A1* | 4/2022 | Sultana | G06F 21/54 |
| 2022/0188412 | A1* | 6/2022 | Borntraeger | G06F 9/3844 |
| 2023/0328081 | A1* | 10/2023 | Najafirad | H04L 63/1416 |
| 2023/0385410 | A1* | 11/2023 | Agarwal | G06F 12/0891 |
| 2024/0086527 | A1* | 3/2024 | Rosen | G06F 21/52 |
| 2024/0143767 | A1* | 5/2024 | Elovici | G06F 11/3466 |
| 2024/0220627 | A1* | 7/2024 | Jeong | G06F 21/577 |
| 2025/0258917 | A1* | 8/2025 | Gechman | G06F 21/561 |

OTHER PUBLICATIONS

Lipp, Moritz, et al. "Meltdown: Reading kernel memory from user space." *Communications of the ACM* 63.6 (2020): 46-56.

Tramèr, Florian, et al. "Stealing Machine Learning Models via Prediction APIs." *USENIX security symposium*. vol. 16. Oct. 3, 2016.

* cited by examiner

FIG. 1

```
1 ; rcx = kernel address, rbx = probe array
2 xor rax, rax
3 retry:
4 mov al, byte [rcx]
5 shl rax, 0xc
6 jz retry
7 mov rbx, qword [rbx + rax]
```

FIG. 2

| | | |
|---|---|---|
| b'e28911d56b9de1f9' | hash1 | element1 |
| b'30921993b67f0000' | *key1 | |
| b'28af8994b67f0000' | *value1 | |
| b'6173736f63696174' | hash2 | |
| b'0000000000000000' | | |
| b'0000000000000000' | | |
| b'647618c160cdb95c' | hash3 | |
| b'30a09394b67f0000' | *key3 | |
| b'40e0a30000000000' | *value3 | |
| b'05f30ffb3bff5fef' | hash4 | |
| b'307a8e94b67f0000' | *key4 | |
| b'e8659394b67f0000' | *value4 | |

FIG. 3

| data type | address(offset) |
|---|---|
| PyObject_Type | 0x6367f0 |
| PyLong_Type | 0xa3c900 |
| PyBool_Type | 0xa3d160 |
| PyFloat_Type | 0xa3d300 |
| PyDict_Type | 0xa3ab20 |
| PyUnicode_Type | 0xa38440 |

FIG. 4

```
{'__name__': '__main__',
...,
'__builtins__': <module 'builtins' (built-in)>,
'tensorflow': <module 'tensorflow' from
'/home/hoyong/.local/lib/python3.6/site-
packages/tensorflow/__init__.py'>,
'model': <tensorflow.python.keras.engine.
sequential.Sequential object at 0x7f4abfcee978>}
```

FIG. 5

```
{...,
'_name': 'sequential_6',
...,
'_layers': [<tensorflow.python.keras.engine.input_layer.InputLayer
object at 0x7f5b7e6d5160>, <tensorflow.python.keras.layers.core.Flatten
object at 0x7f5b7e6d1e10>, <tensorflow.python.keras.layers.core.Dense
object at 0x7f5b7e6cf390>, <tensorflow.python.keras.layers.core.Dense
object at 0x7f5b7e6cf400>],
...,
'_network_nodes': {'flatten_input_ib-6', 'flatten_ib-6', 'dense_ib-12',
'dense_1_ib-13'},
...,
'optimizer': <tensorflow.python.keras.optimizer_v2.adam.Adam object at
0x7f5b7e6d3240>,
...,
'loss': 'sparse_categorical_ crossentropy',
...}
```

```
{...,
'_name': 'dense_12',
...,
'_trainable_weights':[
        <tf.Variable 'dense_12/kernel:0' shape=(784, 10) dtype=float32>,
        <tf.Variable 'dense_12/bias:0' shape=(10,) dtype=float32>
],
'_non_trainable_weights': [],
...}
```

FIG. 8

```
Model: "sequential_6"
_____
Layer (type)                 Output Shape              Param #
=================================================================
flatten_6 (Flatten)          (None, 784)               0
_____
dense_12 (Dense)             (None, 10)                7850
_____
dense_13 (Dense)             (None, 10)                110
=================================================================
Total params: 7,960
Trainable params: 7,960
Non-trainable params: 0
_____

>> layer2
[<tf.variable 'dense_13/kernel:0' shape=(10, 10) dtype=float32, numpy=
array([[ -1.3233812 ,  0.26736608,  1.0216433 ,  0.59734255, -1.0421642 ,
        -0.3907373 , -0.13165668,  1.0037075 , -1.406748  , -2.09728   ],
       [-0.87404656,  0.26599044,  0.17201532, -0.1804208 ,  0.43607864,
        -2.5771687 , -1.6013101 ,  0.25765058, -0.36030576,  0.3341029 ],
       [ 0.60462254,  0.5616927 , -0.3610924 ,  0.46177837, -1.6261365 ,
```

FIG. 9

```
e4 5c a3 00 00 00 00 00 00 00 00 00 00 00 00 00  | .\.............  |
66 6c 61 74 74 65 6e 5f 36 5f 69 6e 70 75 74 5f  | flatten_6_input_ |
69 62 2d 30 00 00 00 00 02 00 00 00 00 00 00 00  | ib-0............ |
...
e4 78 a3 01 00 00 00 00 94 af 00 00 00 00 00 00  | .x.............. |
66 6c 61 74 74 65 6e 5f 36 5f 69 62 2d 30 00 00  | flatten_6_ib-0.. |
00 00 00 00 00 00 00 00 f0 10 ce 74 23 7f d4 8f  | ...........t#... |
...
e4 78 a3 00 00 00 00 00 00 00 00 00 00 00 00 00  | .x.............. |
64 65 6e 73 65 5f 31 32 5f 69 62 2d 30 00 00 00  | dense_12_ib-0... |
03 00 00 00 00 00 00 00 40 84 a3 00 00 00 00 00  | ........@....... |
```

| Hex value: | 0x8e64a9bf | | | | Convert to float | |
|---|---|---|---|---|---|---|

0xbfa9648e(swapped endianness)

| b | f | a | 9 | 6 | 4 | 8 | |
|---|---|---|---|---|---|---|---|
| 1 0 1 1 | 1 1 1 1 | 1 0 1 0 | 1 0 0 1 | 0 1 1 0 | 0 1 0 0 | 1 0 0 0 | 1 1 |

| 1 | 01111111 | 01010010110010010001110 |
|---|---|---| sign     exponent     mantissa
-1     127     0.01010010110010010001110(binary)
-1*     2^(127-127)*  1.323381185316162
-1*     1.00000000*  1.323381185316162
-1.32338

| Float value: | -1.3233812 | Convert to hex |
|---|---|---|

FIG. 13

|  |  | structure | learning rate | loss function | weight & bias | model input |
|---|---|---|---|---|---|---|
| oracle | via prediction APIs [10] |  | △ |  |  | × |
|  | practical black-box attacks [11] |  | △ |  |  | × |
|  | high accuracy and fidelity [12] |  | △ |  |  | × |
|  | stealing hyperparam.s in ML [13] | × | × | ◐ | × | × |
| hardware side-channel | I know what you see [14] | × | × | × | × | ● |
|  | floating-point multiplication [15] | × | × | × | × | ● |
|  | CSI NN [16] | ● | × | × | ◐ | × |
| software side-channel | via timing side-channels [17] | ◐ | × | × | × | × |
|  | leaky DNN [18] | ● | × | × | × | × |
|  | cache telepathy [19] | ● | × | × | × | × |
|  | our attack | ● | ● | ● | ● | ● |

● indicates that the technique can successfully steal the corresponding information.
× indicates that the technique cannot extract corresponding information.
◐ indicates that the extraction is only successful with simple neural networks.
△ indicates that the technique does not steal the corresponding information directly, but constructs a substitute network. The contents of such substitute network are distant from the original victim network; hence it cannot be regarded as an extraction.

METHOD FOR EXTRACTING ARTIFICIAL NEURAL NETWORK BY USING MELTDOWN VULNERABILITY

CROSS REFERENCE TO RELATED APPLICATIONS

This application is a U.S. National Stage Application of International Application No. PCT/KR2021/013267, filed on Sep. 28, 2021, which claims the benefit under 35 USC 119 (a) and 365 (b) of Korean Patent Application No. 10-2020-0126036, filed on Sep. 28, 2020, and Korean Patent Application No. 10-2021-0111132, filed on Aug. 23, 2021, in the Korean Intellectual Property Office, the entire disclosure of which is incorporated herein by reference for all purposes.

TECHNICAL FIELD

The present invention relates to a method and apparatus for extracting internal information of a deep learning model using Meltdown vulnerability in a multi-tenancy environment.

RELATED ART

With the development of deep leaning technology, artificial intelligence (AI) technology is actively applied in various fields in practice. In particular, companies are rushing to adopt AI solutions for an economical efficiency and a service quality improvement, and cloud services are frequently used in this process. Rather than directly constructing an infrastructure for AI development and distribution, there is rapidly increasing interest in cloud services that may introduce AI solutions quickly, stably, and relatively inexpensively. Such services usually operate in a multi-tenancy environment. A cloud service provides a logically independent computing space for each user through virtualization technology and provides a multi-tenancy environment.

The increasing dependence on the cloud has created new security threats and challenges. Unlike a local environment in which firewalls and boundary protection are of most concern, data of a plurality of users resides on the same computer and even an operation is performed on the same computer in the cloud. This is due to a multi-tenancy structure of the cloud and data of other users may be accessed by exploiting the multi-tenancy structure.

When an internal structure of a deep learning model in the cloud is leaked due to an attack, it may cause not only economic loss by intellectual property infringement but also additional damage, such as an adversarial attack, a learning data extraction attack (inversion attack), etc., through the leaked model. Therefore, protecting a machine learning model is a very important issue in a cloud environment. For this reason, research on deep learning model extraction attacks is being actively conducted. The present invention proposes a technique that overcomes the limitations of existing study and enables realistic and practical attacks. The importance of the proposed technique is as follows.

1. Presented is an attack scenario that extracts internal information of a deep learning service operating in a multi-tenant environment using Meltdown. While existing deep learning restoration attacks roughly infer a structure of an artificial neural network, the proposed attack may directly access a memory area of a corresponding deep learning process and may extract all information related to the artificial neural network.
2. Existing Meltdown and Meltdown variant attacks have limitations in that data may not be selectively extracted and it is difficult to parse the extracted data through postprocessing. To solve this, the present invention proposes a technique for identifying a location at which target data is mapped in memory and selectively performing an extraction attack at the corresponding location.
3. Existing Meltdown variant and side-channel attack studies demonstrate an attack on a fixed location under the assumption that an attacker is already aware of a location of data. However, in many deep learning libraries, such as TensorFlow and PyTorch, it is impossible to specify a location of target data prior to execution since memory is dynamically allocated at runtime. The present invention solves experimental environment constraints in previous studies through a method of tracking a location of dynamically allocated variable.

DETAILED DESCRIPTION

Technical Subject

A technical task to be achieved by the present invention is to provide a method and apparatus that may extract an artificial neural network using Meltdown vulnerability.

Technical Solution

An artificial neural network extraction method according to an example embodiment of the present invention refers to an artificial neural network extraction method performed by a computing device communicable with a server that provides Machine-Learning-as-a-Service (MLaaS) and including at least one processor, the method including acquiring a page table of a process to be attacked: acquiring heap section data of the process to be attacked based on the page table: acquiring an artificial neural network instance of the process to be attacked based on the heap section data: and extracting a structure of an artificial neural network model based on the artificial neural network instance.

Effect of Invention

According to an artificial neural network extraction method according to an example embodiment of the present invention, it is possible to provide an extraction method for a deep learning service operating in a remote server.

Also, according to the present invention, it is possible to extract all data of an artificial neural network by directly accessing a target deep learning process memory through a remote side-channel.

BRIEF DESCRIPTION OF DRAWINGS

FIG. 1 illustrates an x86 assembly code that is a core of a Meltdown attack.

FIG. 2 illustrates data stored in PyDictEntry.

FIG. 3 is a table showing a memory location at which each data type class is present in Python 3.5.2 build.

FIG. 4 illustrates a global symbol table.

FIG. 5 illustrates a symbol table of a model instance.

FIG. 8 illustrates internal information of a model to be extracted.

FIG. 9 illustrates a result of extracting each item of an array by a Meltdown attack for a 'network_nodes' element of model instance symbol data.

FIG. 10 illustrates a result of successfully extracting weight information of an artificial neural network.

FIG. 11 illustrates IEEE 754 single precision decoding.

FIG. 13 is a table that summaries differences from existing studies in terms of extractable information.

MODE

Figures 6, 7:
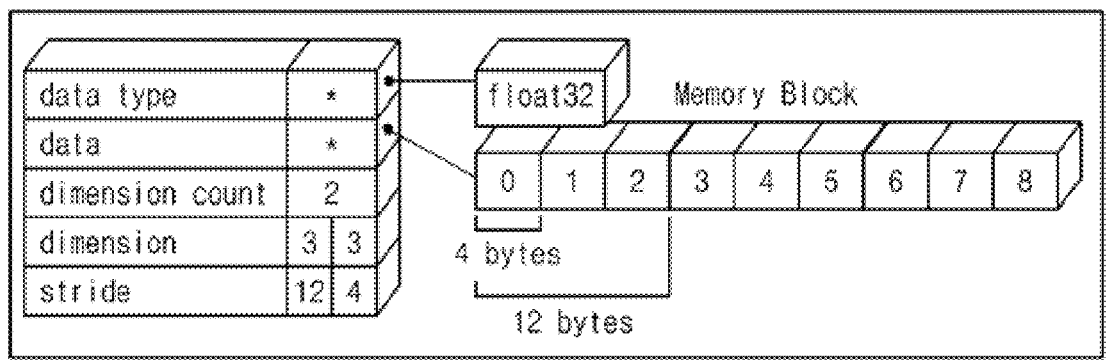
FIG. 6 illustrates a symbol table of a hidden layer instance.
FIG. 7 illustrates a structure of tf. Variable.

The following structural or functional descriptions of example embodiments according to the concept of the present invention disclosed herein are merely intended for the purpose of describing the example embodiments according to the concept of the present invention. The example embodiments according to the concept of the present invention may be implemented in various forms and are not construed as being limited to example embodiments described herein.

Various modifications and various forms may be made to the example embodiments according to the concept of the present invention and thus, the example embodiments are illustrated in the drawings and described in detail in the present specification. Here, the example embodiments are not construed as limited to specific implementations and should be understood to include all changes, equivalents, and replacements within the idea and the technical scope of the present invention.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to another component or that still other component is interposed between the two components. On the contrary, it should be understood that if it is described in the specification that one component is "directly connected" or "directly accessed" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments of the present invention will be described in detail with reference to the accompanying drawings. However, the scope of the claims is not limited thereto or restricted thereby. Like reference numerals refer to like components throughout.

In the following, existing artificial neural network extraction techniques are introduced and limitations thereof are specified. The existing studies may be specified as follows:
1. Oracle-based attack that generates a large number of input/output for a deep learning service and analyzes the same;
2. Hardware side-channel-based attack that physically secures a device equipped with a deep learning service and then performs a propagation/power side-channel attack: and
3. Software side-channel-based attack that softwarely performs a side-channel attack against a remotely accessible deep learning service, such as cloud.

The oracle-based attack goes through a process of continuously sending a query to a deep learning service to be attacked and analyzing a response thereto. This attack mainly uses a method of newly constructing a substitute model (substitute network) based on an original model. The substitute model may perform similar functionality as the original model, but may not exactly discover internal information. Also, due to a low resolution of extractable information, it becomes meaningless to construct the substitute model when a deep learning model is complex.

The hardware side-channel-based attack uses a method of directly performing a power analysis or an electromagnetic attack on a device equipped with a deep learning service. Therefore, while the attack range thereof is very limited, the present invention proposes a technique that may attack a deep learning model provided to a cloud service.

Recent studies including the present invention propose an extraction attack on a deep learning service running on a remote server. This is a method of finding a remotely controllable software side-channel and using the same to leak data. Therefore, the attack scope is greatly expanded, but all previous software side-channel techniques focus on identifying only an approximate structure of an artificial neural network. On the contrary, the technique proposed herein directly accesses a target deep learning process memory through a remote side-channel and extracts all data from an artificial neural network.

In the following, the background knowledge of the present invention is described.

1. Deep Learning

An artificial neural network refers to an algorithm that includes perceptron, weight, bias, and activation function and is in a structure in which a relationship between input and output is learned by repeatedly adjusting the weight through an input value and a target output value. Deep leaning is an advanced form of an artificial neural network and includes a combination of a plurality of hidden layers.

A single hidden layer includes a plurality of perceptron and an output value acquired after an internal operation in each perceptron is given as input of a next hidden layer. In single perceptron, after adding a bias to a weighted sum of the input and the weight, the activation function is applied and passed to the next hidden layer.

Recently, the cloud is attracting attention for quick and convenient deployment of a deep learning service. Rather than directly constructing a server, the cloud is inexpensive to provide a large-scale computing environment for training an artificial neural network and a flexible API environment suitable for service distribution. There are various types of cloud services, such as Infrastructure-as-a-Service (IaaS), Platform-as-a-Service (PaaS), Machine-Learning-as-a-Service (MLaaS), Software-as-a-Service (SaaS), and the like. Most of the cloud services operate in a multi-tenancy environment. Each company selects a service type according to demand and provides a deep learning service to users on the selected service type.

2. Meltdown

Meltdown is a hardware vulnerability that may read memory without access privileges by maliciously using out-of-order execution of a processor. At the time of disclosure in early 2018, most Intel processors and ARM Cortex-A75-based systems were known to be affected by this vulnerability. The out-of-order execution refers to optimization technology for effectively utilizing a pipeline of a processor and technology for preferentially executing an instruction executable regardless of order of instructions. The processor performs a privilege inspection before an instruction executed out-of-order is committed. When access to an unauthorized memory area is confirmed, execution of a corresponding instruction is stopped through a rollback interrupt and the pipeline is initialized. Therefore, in general, a user may be unaware of a final execution result of a corresponding instruction. However, during the out-of-order execution of the corresponding instruction, the referenced memory contents are loaded into a cache and the data is inaccessible in a normal way, but the corresponding data may be extracted by performing a cache side-channel attack, such as Flush+Reload.

FIG. 1 illustrates shows an x86 assembly code that is a core of a Meltdown attack. An attacker aims to reveal value X of target memory address rex. Line 4 instruction stores X in rax register. Since this is an unauthorized access, rollback is performed before commit. However, before the rollback interrupt occurs, lines 5 through 7 instructions are executed due to out-of-order execution. Here, the line 7 instruction accesses the contents of $X^{th}$ page from rbx and loads the corresponding page into the cache. When the corresponding page is accessed again afterwards, cache hit may occur and an access time may be shorter than those of other pages. Due to such difference in access time, the attacker may find out the value X. The attacker may measure the access time while accessing all the pages of the processor of the attacker one by one and may find that a page with the fastest access speed is the $X^{th}$ page accessed in line 7.

Since cache side-channel attacks prior to Meltdown utilized a side-channel in L1 cache, a strong condition is required that the attacker and a process to be attacked (hereinafter, victim) need to be allocated within the same core. However, in the case of Meltdown, a side-channel of a last level cache (LLC) is used and thus, placement of the same CPU is premised. In a cloud environment, since a plurality of users share the limited number of hardware, they are often allocated on the same CPU. By maliciously using this, the attacker may access data of another user via Meltdown attack in a cloud environment.

3. Dynamic Memory Allocation

Unlike static allocation of which a data type and size are determined during a compilation stage, a size of dynamic allocation is determined at runtime and space arrangement is performed accordingly. Therefore, dynamic allocation goes through an operation of allocating a memory area and an operation of storing a pointer for the corresponding area.

The present invention focuses on Python's dynamic memory allocation. Python uses a dictionary-type symbol table to track dynamically allocated objects at runtime, which is stored as a PyDict_Type instance.

A PyDict_Type instance stores various information related to the symbol table. Actual data of the dictionary is stored at an external location (PyDictEntry) and a pointer to the corresponding PyDictEntry is recorded in the PyDict_Type instance. Each element of PyDictEntry includes a hash, a key pointer, and a value pointer. Key and value information is not directly recorded and has a pointer to the corresponding data. A key pointer and a value pointer refer to a string instance corresponding to a name of each variable and an instance corresponding to actual data of the corresponding variable, respectively. FIG. 2 illustrates data stored in PyDictEntry.

In the following, a technique (method) of accessing a deep learning process of another user and extracting an artificial neural network is described. An extraction attack includes a total of six stages and shows that an attack of extracting an input query to a deep learning service by modifying a portion of the six stages is also possible.

Stage 1: Groundwork

The groundwork includes identification of an attackable environment and a co-location test to determine whether the same CPU with that of a victim is used. Whether it is an attackable environment may be identified simply by confirming a system version. A co-location status may also be determined simply by sending an input query to a victim deep learning service and by monitoring a function usage using a cache side-channel, such as Flush+Reload.

Stage 2: Extract Page Table of Victim

A Linux kernel stores information of every process in a linked list format for process management. A head of the corresponding linked list is stored in an init_task structure and this is present at a fixed location for each kernel. Therefore, referring to the disclosed Linux kernel build, a head location of the linked list at which the process information is stored may be identified. A Meltdown attack on this location is performed. The Meltdown attack is repeatedly performed on a new node up to a node of the victim by referring to a pointer to a next node in the linked list. Here, whether a corresponding node is a node of the victim may be determined using a process name stored in the node. That is, the node of the victim may be identified using a known name of the process of the victim.

In each node, not only information, such as memory mapping information, a process identifier (PID), and a name of a corresponding process, but also a location of a page table is recorded. The page table is secured by specifying a location of the page table of the victim and by performing a Meltdown attack on the corresponding location.

Stage 3: Extract Heap Section of Victim

To identify a location of data inside a process, a symbol table in which such information is stored needs to be secured. As mentioned earlier, Python's symbol table is managed as a dictionary instance called PyDict_Type. Since all the data in the dictionary is allocated in a heap section, heap section data of the victim needs to be secured first.

A heap section of victim memory is extracted by identifying a physical address to which the victim is mapped is identified using the page table extracted in stage 2, and by performing a Meltdown attack on the corresponding location.

Stage 4: Extract Victim Artificial Neural Network Instance

For targeted attacks, meaningful data needs to be located. Therefore, prior to extracting an artificial neural network (hereinafter, model), a process of determining to which portion of a process memory the artificial neural network is mapped is preceded.

Every Python instance has a pointer to a class that refers to its data type. For example, all Unicode string data refers to PyUnicode_Type class. Since a location of such default datatype class is fixed for each Python build, all instances of a specific datatype may be captured by conducting a search using this location value.

FIG. 3 is a table showing a memory location at which each data-type class is present in a Python 3.5.2 build. Referring to FIG. 3, PyDict_Type class is fixedly mapped at 0xa3ab20 and all dictionary instances store this address value. Therefore, it is possible to locate all dictionary instances by searching for instances including this address value in the heap section data extracted in stage 3.

A global symbol table of FIG. 4 is a dictionary that includes global symbols among all dictionaries. The global symbol table may be specified among a plurality of dictionaries depending on presence or absence of elements included exclusively in the global symbol table. A target instance is extracted by performing a Meltdown attack on an address of a model instance among elements of a corresponding dictionary.

Stage 5: Extract Model Structure

Another symbol table used internally in a corresponding instance is present in an instance of a model. An instance symbol table is captured in the same manner as a method of selecting the global symbol table in stage 4. That is, the symbol table is PyDict_Type class, and Pydict_Type instance stores the address value 0xa3ab20. Therefore, the symbol table may be acquired by searching for an instance that includes the corresponding address value from among instances of the model.

The captured model instance is in a form of FIG. 5. It can be observed that layer information of the artificial neural network is present in a form of an array in 'network_nodes.' Therefore, a structure of the model may be verified by extracting this element.

Stage 6: Extract Weight of Model

Where hidden layer information is stored is discovered to extract a weight of the model. A corresponding element is found from a symbol table of the model instance and a location of each hidden layer is identified by analyzing the element. Since a value of '_layers' element in FIG. 5 refers to a list configured with a pointer of each hidden layer instance, the value is used.

A symbol table of a corresponding instance is captured in the same manner by accessing each hidden layer instance and a value of '_trainable_weights' element is accessed using the symbol table. That is, the symbol table is PyDict_Type class and Pydict_Type instance stores the address value 0xa3ab20. Therefore, the symbol table may be acquired by searching for an instance that includes the corresponding address value from among hidden layer instances.

It can be seen from FIG. 6 that the '_trainable_weights' element includes an array of two tf. Variables, matrices corresponding to weight and bias values, respectively. tf. Variable is a data type used internally by TensorFlow for tensor data.

A structure of tf. Variable is shown in FIG. 7. The matrix is stored as a row-major array and array data is interpreted as a matrix using header information, such as stride and dimension. A memory block of FIG. 7 represents a 3×3 two-dimensional (2D) matrix, and it can be seen that the memory block is configured as 4 bytes per data and 12 bytes per row.

The original weight and bias matrix is restored by extracting the array and the header information via Meltdown attack on each tf. Variable and by interpreting the same.

Hereinafter, an experiment result acquired by applying an artificial neural network extraction method according to the present invention is described.

1. Experiment Environment

The experiment was conducted in a local Linux server and used a multi-user environment provided by default in a kernel. A victim and an attacker access a corresponding system as different users and are assigned with an independent environment isolated by the kernel. A TensorFlow MNIST handwriting recognition deep learning service was used as the victim and specific environment settings are as follows:

.CPU: Intel® Core™ i5-7500
.kernel: Linux version4.12.0
.OS: Ubuntu 16.04.6 LTS

FIG. 8 illustrates information of a victim deep learning model and the attacker aims to extract the same. For convenience of the experiment, after performing stage 3 of an attack with administrator privileges, the rest of stages were performed without authorization.

2. Experiment Result

Figures 9, 10:
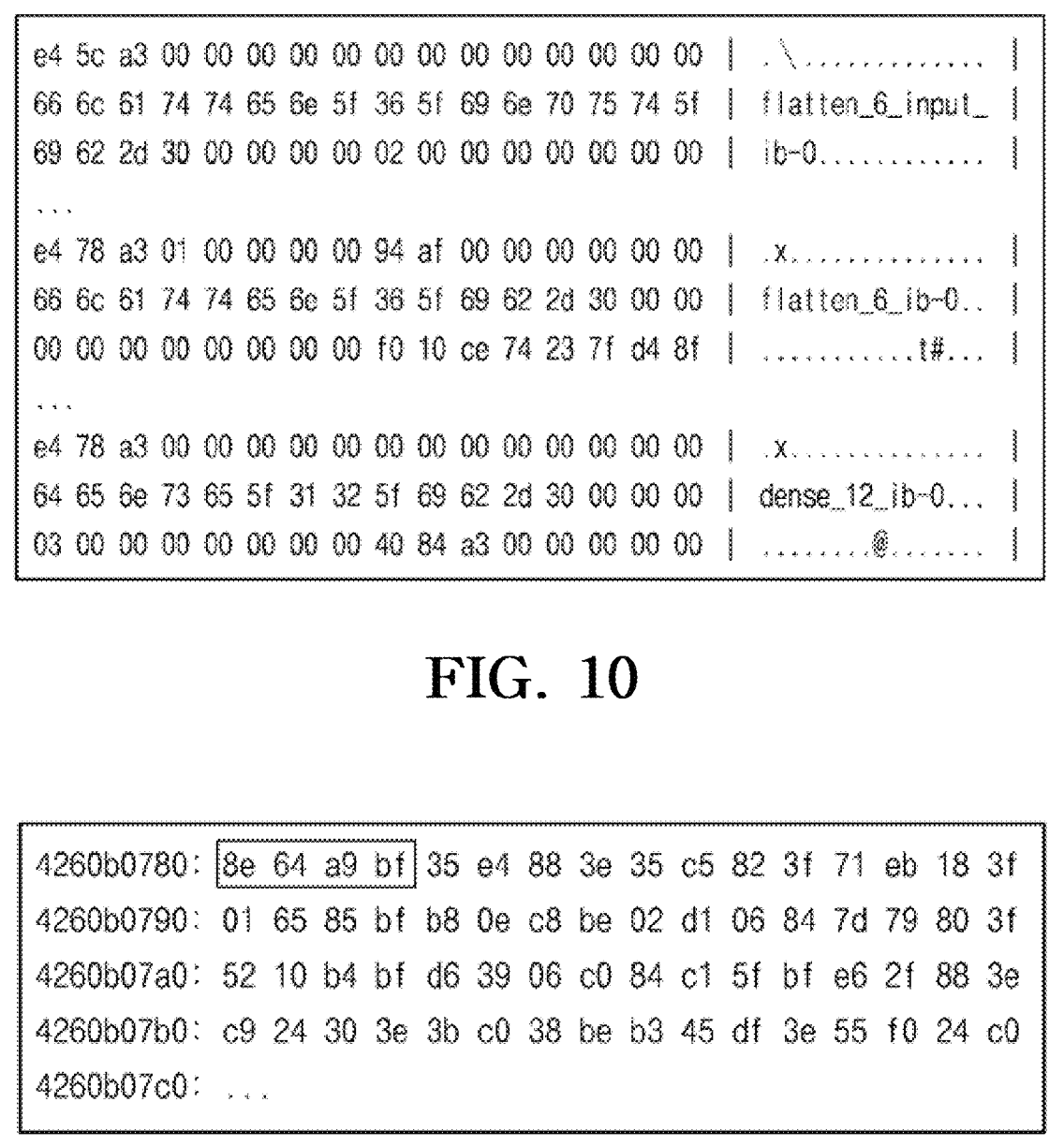

FIG. 9 illustrates a result of extracting each item of an array via a Meltdown attack on a 'network_nodes' element of model instance symbol data. A name of each hidden layer is stored in ASCII code. This is used to reproduce a model structure.

FIG. 10 illustrates a result of successfully extracting weight information of a victim artificial neural network. Since each weight value is converted and stored in a little-endian floating-point format, it can be seen from FIG. 11 that a first weight is correctly extracted and other weight information following the first weight is also consecutively stored.

Figure 12:
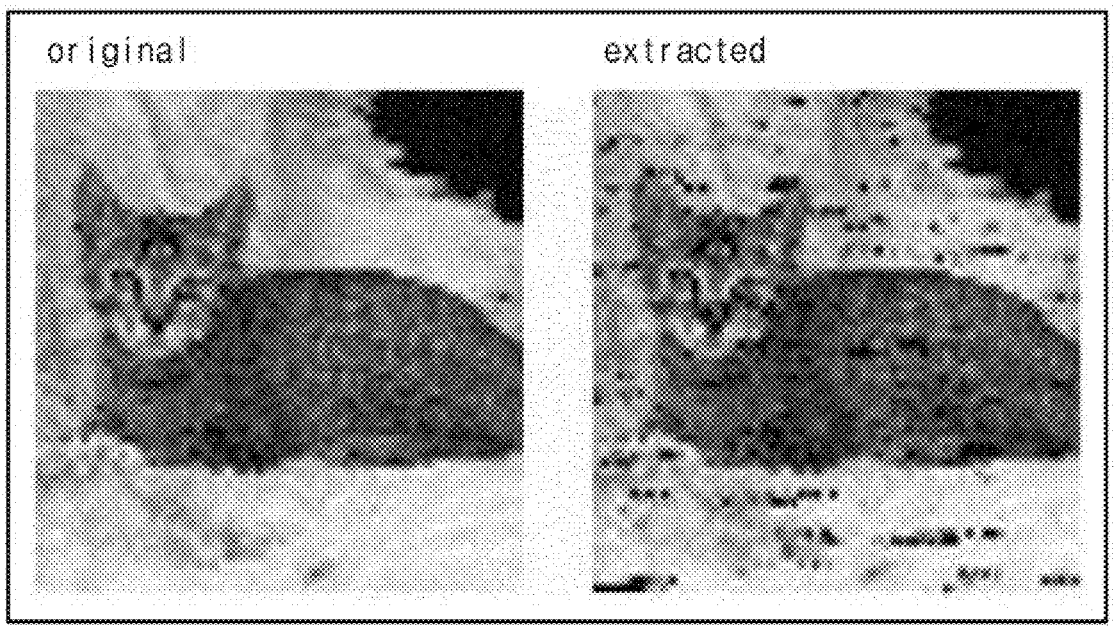
FIG. 12 illustrates input data extracted by performing an attack on a VGG16 image recognition deep learning model.

Also, input of a deep learning model may be extracted by modifying stage 4 of an attack to target a query input to a deep learning service. This may cause a great threat when sensitive data, such as user face recognition or voice recognition, is used as input. FIG. 12 illustrates input data extracted by performing attack on a VGG16 image recognition deep learning model. This is the result extracted with a single attack and extraction accuracy may be improved by correcting noise via repetitive attacks.

Prior to the present invention, various studies on artificial neural network restoration attack techniques were conducted. However, most existing artificial neural network restoration attacks focus on extracting only a structure of an artificial neural network and may not restore other internal information, such as weights or activation functions. In addition, the accuracy of many previous techniques that restore the structure by monitoring the use of functions or timing differences significantly decreases as the structure of the artificial neural network becomes complex, whereas the attack technique proposed in the present invention is not affected by the complexity of the artificial neural network.

While the experiment previously conducted herein extracts only the structure of the artificial neural network, weight, and input image information, all other information related to the artificial neural network may be extracted in the same manner. FIG. 13 is a table that summarizes differences from existing studies in terms of extractable information.

To evaluate performance of the attack proposed herein, a weight value of the victim artificial neural network was compared with an extracted weight value. Through this, the extraction accuracy and time at a byte level were measured. The corresponding experiment used Flush+Reload as basis of Meltdown. The result of analyzing the extraction attack in the aforementioned experiment environment showed an accuracy of 92.875% and an extraction speed of 1.325 KB/s. Such performance varies slightly by CPU and environment, and may be optimized by following measures:

Optimization 1: Improve Meltdown Performance

Since the performance of the attack proposed herein depends on the performance of Meltdown, the speed and accuracy of the entire attack pipeline may be improved by increasing the number of Meltdown sampling or by sharing the same core with the victim.

Optimization 2: Utilize Python Fixed Hash

Hash, key pointer, and value pointer information may be included in a symbol table dictionary. Therefore, it is impossible to identify each element with simply securing a symbol table. Only when a key pointer location is extracted via Meltdown attack, a variable name of a corresponding element may be identified. However, in Python versions prior to 3.3, a simple hash function is used for a hash part of the dictionary. Therefore, an attacker may select a desired variable by directly acquiring a hash value of a variable name desired by the attacker and by comparing the same with a hash value in the dictionary, without a need to separately extract a key pointer. In this case, a process of interpreting the symbol table is shortened and the attack performance is improved.

Figure 14:
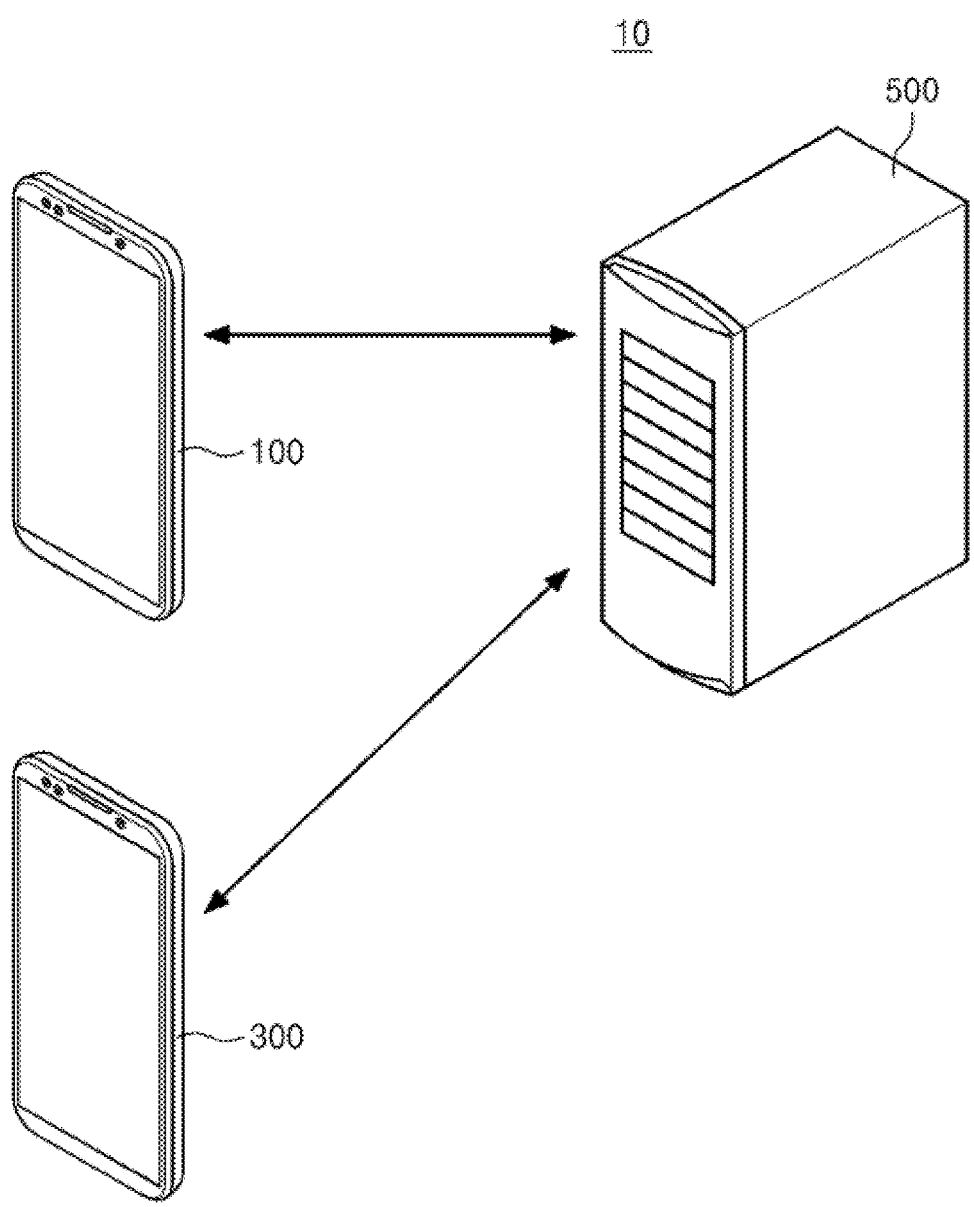
FIG. 14 illustrates a system according to an example embodiment of the present invention.

FIG. 14 illustrates a system according to an example embodiment of the present invention. In the following description, further description related to the aforementioned description is omitted.

A system 10, which is referrable to as an artificial neural network extraction system, an extraction system, and the like, includes a user terminal 100, an extraction apparatus 300, and a server 500.

The server 500 may provide a cloud service, for example, at least one service among IaaS, PaaS, MLaaS, and SaaS, to a registered user, the user terminal 100 and/or the extraction apparatus 300. Communication between the user terminal 100 and the server 500 and between the extraction apparatus 300 and the server 500 may be performed through a predetermined wired/wireless communication network.

Also, the server 500 may represent a physically separated single server. That is, the user terminal 100 and the extraction apparatus 300 may be provided with a predetermined service from a single server.

The user terminal 100 refers to a terminal that is provided with a predetermined service from the server 500 and may represent a plurality of terminals depending on example embodiments. The service provided to the user terminal 100 from the server 500 may be MLaaS, but the present invention is not limited thereto.

The extraction apparatus 300 refers to a computing device that includes at least a processor and/or memory and may extract an artificial neural network provided from the server 500 to a user, for example, the user terminal 100. The extraction apparatus 300 may exchange data through communication with the server 500, and may extract at least one of a structure of an artificial neural network model provided to the user terminal 100, weights of the artificial neural network, bias of the artificial neural network, and input of the artificial neural network, based on the received data. To this end, the extraction apparatus 300 may perform a Meltdown attack on a predetermined location of a memory area of the server 500.

Figure 15:
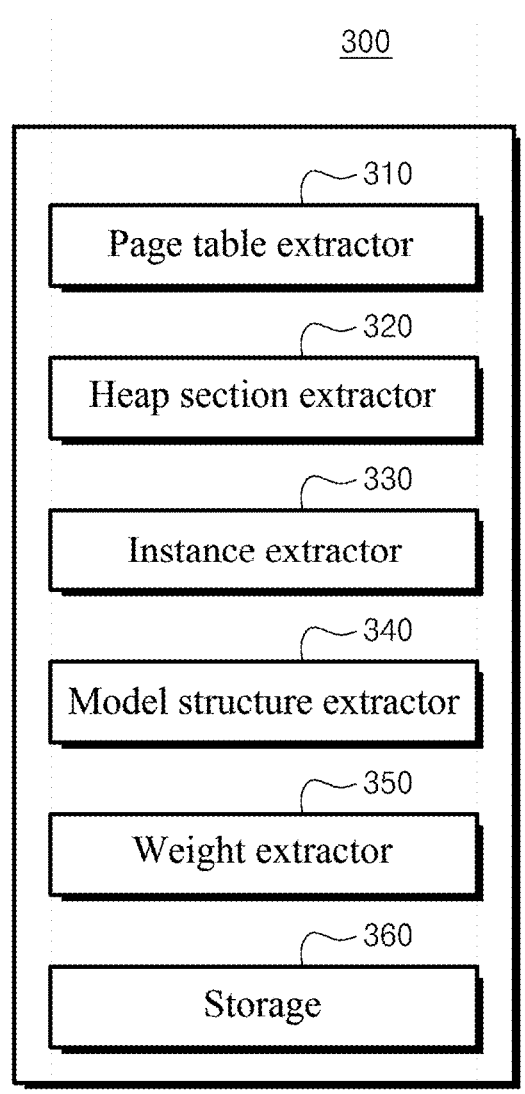
FIG. 15 is a block diagram illustrating an extraction apparatus of FIG. 14.

FIG. 15 is a block diagram illustrating an extraction apparatus of FIG. 14.

Referring to FIG. 15, the extraction apparatus 300 includes a page table extractor 310, a heap section extractor 320, an instance extractor 330, a model structure extractor 340, and a weight extractor 350. Depending on example embodiments, the extraction apparatus 300 may further include a storage 360.

The extraction apparatus 300 refers to a computing device that includes at least a processor and/or memory and, in the following, an operation of at least a portion of each of the components may be understood as an operation of the processor. Depending on example embodiments, the extraction apparatus 300 may exchange data with the server 500. The operation may be understood as an operation of sending predetermined data to the server 500 and receiving data corresponding thereto in such a manner that the processor of the extraction apparatus 300 controls a communication module (not shown) additionally includable in the extraction apparatus 300.

The page table extractor 310 may extract a page table of a process to be attacked. The process to be attacked may be referred to as an artificial neural network model to be attacked, an artificial neural network model to be extracted, a victim, a model to be attacked, and a model to be extracted.

To this end, the page table extractor 310 may perform a Meltdown attack on a head location of a connected list in which process information is stored. The head location of the connected list may be verified in advance through a disclosed Linux kernel build. Also, the page table extractor 310 may repeatedly perform the Meltdown attack on a new node up to a node of a victim (also referrable to as a node to be extracted) by referring to a pointer for a next node in the connected list. The page table extractor 310 may determine whether a corresponding node is a node of the victim using a process name, a PID, and the like stored in the node. Through this, the page table extractor 310 may extract data stored in the node of the victim.

Also, the page table extractor 310 may acquire a page table of the victim by performing a Meltdown attack on a location of the page table recorded in the extracted node.

The heap section extractor 320 may extract a heap section (heap section data) of victim memory by performing the Meltdown attack on a physical address to which the victim is mapped. The mapped physical address may be included in the page table extracted by the page table extractor 310.

The instance extractor 330 may extract an artificial neural network instance of the victim. To this end, the instance extractor 330 may extract only a dictionary instance from heap section data extracted by the heap section extractor 320. Additionally, the instance extractor 330 may select a global symbol table that includes a global symbol from among extracted dictionary instances. Since an address of a model instance is included in the selected global symbol table, the instance extractor 330 may extract a target instance, that is, the artificial neural network instance of the victim by performing the Meltdown attack on the address of the model instance.

The model structure extractor 340 may extract a model structure. To this end, the model structure extractor 340 may acquire an instance symbol table from the extracted target instance. The model structure extractor 340 may verify (extract) a structure of the model based on artificial neural network layer information included in the instance symbol table.

The weight extractor 350 may extract weight and/or bias values included in the model. To this end, the weight extractor 350 may access each hidden layer instance using pointer information of each hidden layer instance included in a symbol table of the model instance. That is, the weight extractor 350 may extract weight and/or bias values of each hidden layer described in the symbol table of each hidden layer instance.

The storage 360 may store the page table extracted by the page table extractor 310, data required to extract the page table or data temporarily or non-temporarily generated in the process of extracting the page table, heap section data extracted by the heap section extractor 320, the dictionary instance extracted by the instance extractor 330, the global symbol table, the target instance, the structure of the model extracted by the model structure extractor 340, weight and/or bias values of each hidden layer extracted by the weight extractor 350, and the like.

As described above, using data acquired as a result of performing a Meltdown attach on a predetermined location in memory of the server 500, the extraction apparatus 300 may extract at least one of an artificial neural network structure and weight and bias values of each hidden layer provided to the user terminal 100.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporarily embodied in any type of machine, component, physical equipment, virtual equipment, a computer storage medium or device, or a signal wave to be sent, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes: optical media such as CD-ROM and DVDs: magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to operate as one or more software modules to perform the operation of the example embodiments, or vice versa.

While the present invention is described with reference to example embodiments illustrated in drawings, it is provided as an example only and it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents. Therefore, the true technical protection scope of the present invention should be determined by the technical spirit of the claims.

What is claimed is:

1. An artificial neural network extraction method performed by a computing device communicable with a server that provides Machine-Learning-as-a-Service (MLaaS) and comprising at least one processor, the method comprising:
   acquiring a page table of a target process running an artificial neural network model on the server, wherein the page table is acquired by performing a side-channel (Meltdown) attack on the target process;
   acquiring heap section data of the target process based on the page table;
   acquiring an artificial neural network instance of the target process based on the heap section data; and
   extracting a structure of an-the artificial neural network model based on the artificial neural network instance.

2. The method of claim 1, wherein the acquiring of the page table comprises:
   performing a Meltdown attack on a head location of a connected list in which process information is stored in a memory of the server and extracting the connected list;
   performing the Meltdown attack on a next pointer based on a pointer for the next pointer included in the connected list at least once and acquiring a node of the target process; and
   performing the Meltdown attack on a location of the page table included in the node of the target process and acquiring the page table.

3. The method of claim 1, wherein the acquiring of the page table comprises:
   acquiring a physical address to which the target process is mapped using the page table; and
   performing the Meltdown attack on the physical address and acquiring the heap section data.

4. The method of claim 1, wherein the extracting of the artificial neural network instance comprises:
   acquiring a dictionary instance from the heap section data;
   acquiring a global symbol table from the dictionary instance; and
   performing the Meltdown attack on an address of the artificial neural network instance of the target process included in the global symbol table and extracting the artificial neural network instance.

5. The method of claim 4, wherein the extracting of the structure of the artificial neural network model comprises;
   acquiring an instance symbol table from the artificial neural network instance; and
   extracting the structure of the artificial neural network model based on layer information of the artificial neural network model included in the instance symbol table.

6. The method of claim 5, further comprising:
   extracting a weight of the artificial neural network model, wherein the extracting of the weight comprises:
   acquiring a pointer of each hidden layer instance included in the instance symbol table;
   acquiring a symbol table of each hidden layer instance; and
   acquiring a weight of each hidden layer from the symbol table of each hidden layer instance.

* * * * *